(12) United States Patent
Homer et al.

(10) Patent No.: US 7,187,540 B2
(45) Date of Patent: Mar. 6, 2007

(54) EASILY REPLACEABLE COVER WINDOW FOR ELECTRONIC DEVICE

(75) Inventors: Steven S Homer, Tombal, TX (US); Paul J. Doczy, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 48 days.

(21) Appl. No.: 11/038,894

(22) Filed: Jan. 18, 2005

(65) Prior Publication Data

US 2006/0158862 A1 Jul. 20, 2006

(51) Int. Cl.
*G06F 1/16* (2006.01)

(52) U.S. Cl. ........................................ 361/681; 345/173

(58) Field of Classification Search ............... 361/679, 361/681, 683; 345/173, 156
See application file for complete search history.

(56) References Cited

U.S. PATENT DOCUMENTS

2004/0042160 A1* 3/2004 Yang et al. ................. 361/681

* cited by examiner

*Primary Examiner*—Hung V. Ngo
(74) *Attorney, Agent, or Firm*—David W. Boyd

(57) ABSTRACT

A cover window attachment system for an electronic device includes a cover window on a top side of the electronic device; a frame attached to the cover window, the frame further comprising at least one boss configured to protrude into the electronic device; a fastener receiving feature on a distal end of each boss; and a fastener engaging the fastener receiving feature on each boss, the fastener contacting a bottom side of the electronic device, opposite the top side. Also claimed are a method of assembling a cover window to an electronic device and an electronic device including a cover window assembly.

34 Claims, 5 Drawing Sheets

SECTION A-A

SECTION A-A

EASILY REPLACEABLE COVER WINDOW FOR ELECTRONIC DEVICE

FIELD OF THE INVENTION

The present invention relates to portable electronic devices, and more particularly to a method and apparatus for assembling a cover window to a portable electronic device.

BACKGROUND OF THE INVENTION

The cover window of a portable electronic device, such as a pen-based "tablet" portable computer, is subject to damage. For example, extensive use may scratch the window, or the window may be cracked or broken during the rigors of portable use. Repair of a worn or damaged cover window is often expensive, and often requires a user of the device to return it to its manufacturer, leaving the user without the use of the device for an extended period.

There is a need for a way to repair or upgrade the cover window of a portable electronic device with minimal inconvenience and cost to the user.

SUMMARY OF THE INVENTION

A cover window attachment system for an electronic device comprises a cover window on a top side of the electronic device; a frame attached to the cover window, the frame further comprising at least one boss configured to protrude into the electronic device; a fastener receiving feature on a distal end of each boss; and a fastener engaging the fastener receiving feature on each boss, the fastener contacting a bottom side of the electronic device, opposite the top side.

DETAILED DESCRIPTION

Figure 1:
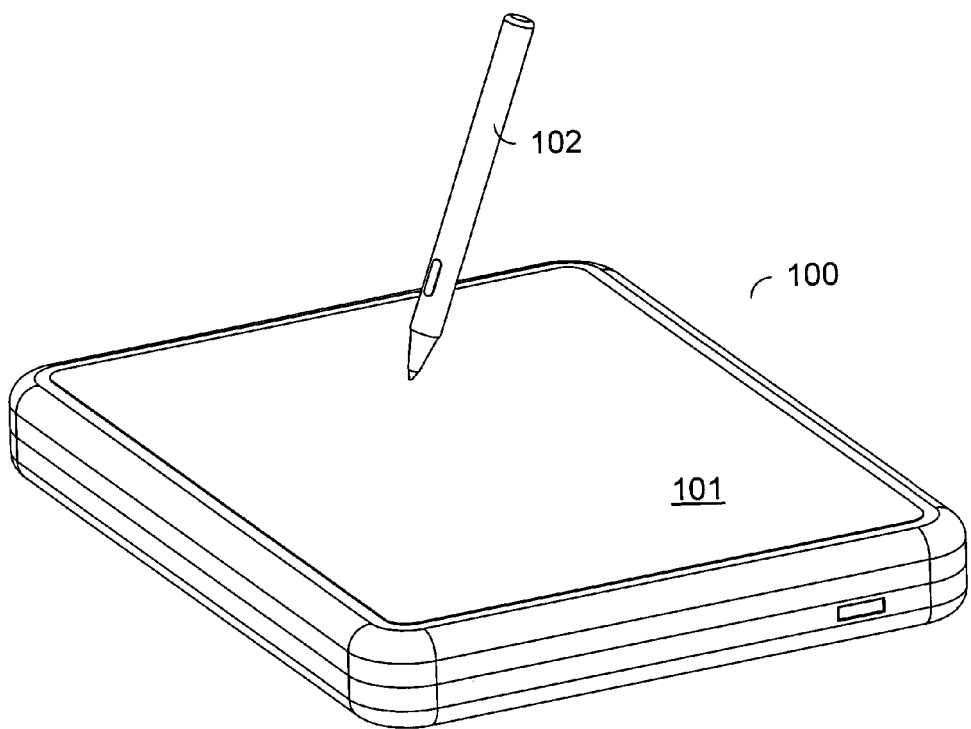
FIG. 1 shows a tablet portable computer in accordance with an example embodiment of the invention.

FIG. 1 shows a tablet portable computer 100 in accordance with an example embodiment of the invention. A tablet computer uses a pen-based user interface, and performs substantially all of the functions that are performed by a traditional portable computer that uses a keyboard. Computer 100 has a cover window 101 on its top side. Cover window 101 is preferably made of glass, but may also be made of any substantially rigid, substantially transparent material now known or later developed. A user of tablet computer 100 uses pen 102 to "write" on the cover window 101 of computer 100. Computer 100 senses the location and movement of pen 102, and provides appropriate feedback on a display behind cover window 101. The display (not visible in FIG. 1) may be a liquid crystal display, or another kind of display. For example, if computer 100 is executing a drawing program, the display may show a line that appears to be drawn by pen 102 as the user moves pen 102 over cover window 101. Computer 100 may sense the location of pen 102 using radio-frequency signals, or by other methods. Such methods are known in the art.

Cover window 101 is subject to damage. For example, during use, pen 102 repeatedly contacts cover window 101, and can cause wear. And because computer 100 is lightweight and portable, it may be subjected to other external effects. For example, computer 100 may be repeatedly slid in and out of a carrying case, scratching window 101 in the process. Or computer 100 may be dropped or have another object dropped on it, chipping or breaking window 101.

In prior tablet computers, repair or replacement of the cover window is expensive and difficult. In a computer in accordance with an example embodiment of the invention, repair or replacement of the cover window 101 is simplified, and may even be performed by the computer user.

Figure 2:
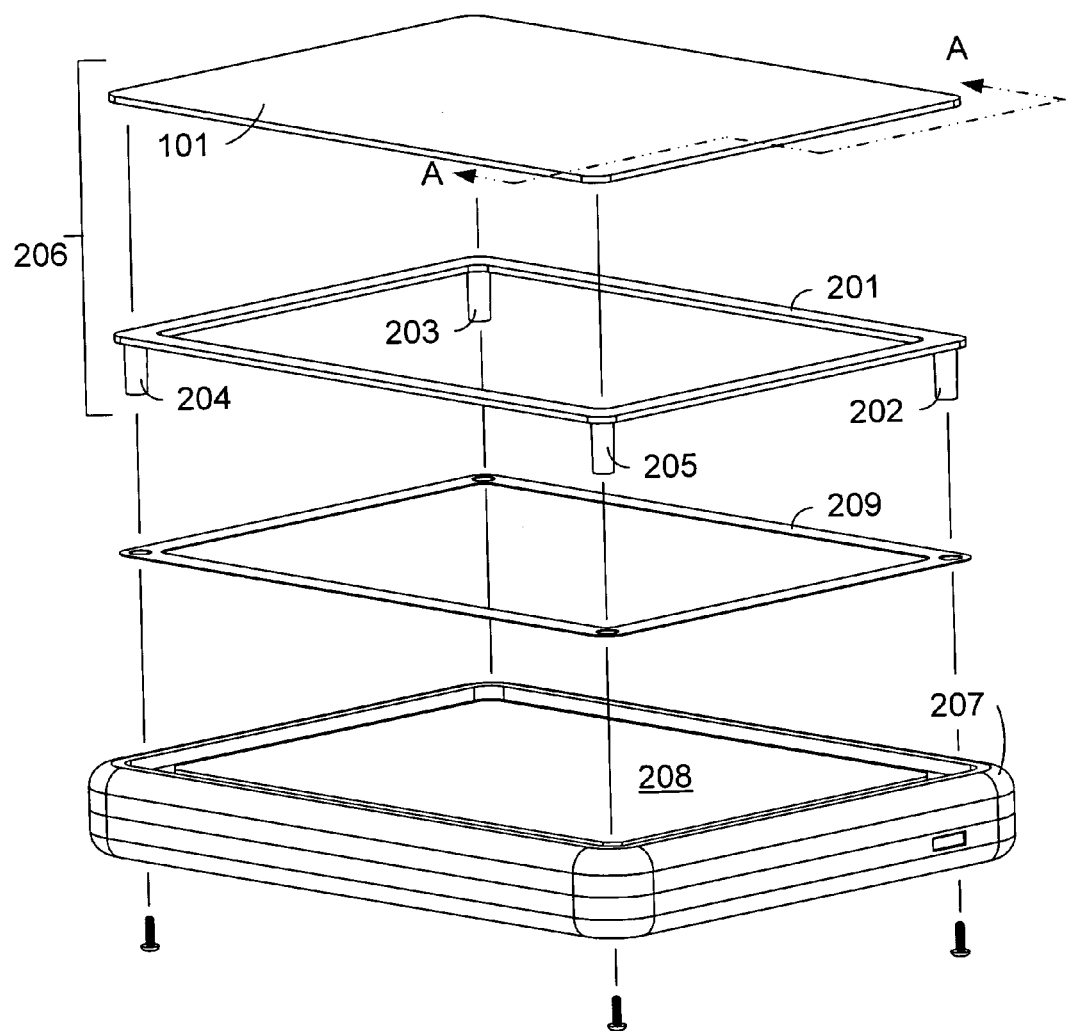
FIG. 2 shows an exploded view of the tablet computer of FIG. 1.
Figure 3A:
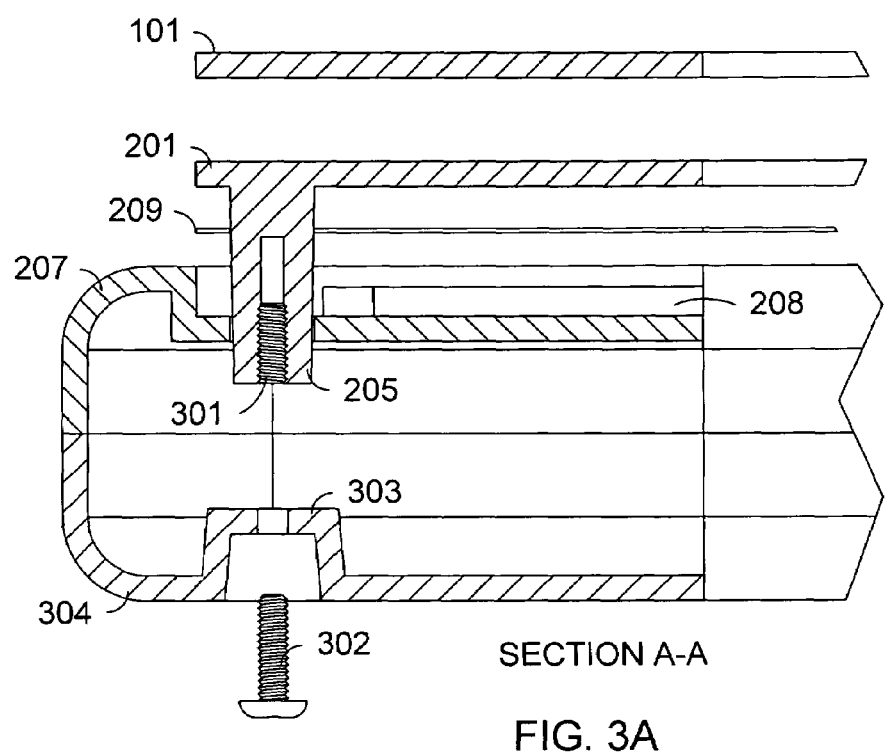
FIG. 3A shows an exploded section view of a portion of the tablet computer of FIG. 1.
Figure 3B:
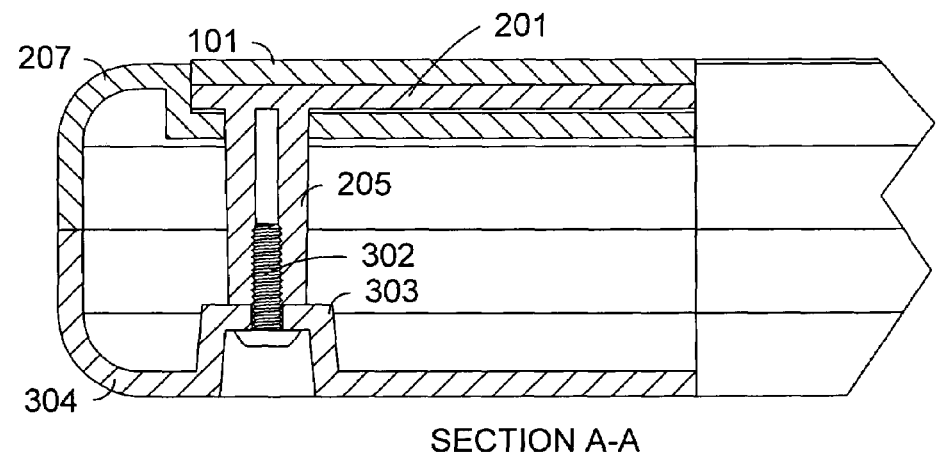
FIG. 3B shows a section view of the tablet computer of FIG. 1 in its assembled state.

FIG. 2 shows an exploded perspective view of the tablet computer of FIG. 1. FIG. 3A shows an exploded section view of part of computer 100, and FIG. 3B shows section view of part of computer 100 in its assembled state. Referring to all three FIGS. 2, 3A, and 3B, cover window 101 attaches to frame 201. Frame 201 may be made, for example, of die-cast magnesium, injection-molded plastic, or by other materials and methods. Frame 201 comprises bosses 202–205 which may be integrally formed with the main portion 210 of frame 201, or attached to it. Cover window 101 and frame 201 make up a cover window assembly 206. The attachment between cover window 101 and frame 201 may preferably be made using an adhesive, or an adhesive tape. Suitable adhesives and tape are known in the art.

Cover window assembly 206 is assembled into computer 100 by inserting bosses 202–205 into openings in case 207 of computer 100. Upon assembly, frame 201 partially surrounds display 208, and cover window 101 is in close proximity to display 208. A gasket 209 may be situated between frame 201 and case 207 in order to prevent dust, liquids, or other materials from entering computer 100, and especially to keep dust from finding its way between cover window 101 and display 208.

In example computer 100, each of bosses 202–205 comprises a threaded opening in its distal end. The distal end of each boss 202–205 is the end furthest from the main portion of frame 201. For example, boss 205 comprises threaded hole 301. Each of the threaded openings receives a screw from the bottom side of computer 100. For example, hole 301 receives screw 302. When computer 100 is fully assembled, the head of screw 302 resides in boss 303 comprised in the lower shell 304 of computer 100, and contacts a bottom side 305 of computer 100. The other screws reside in similar bosses.

Figure 4:
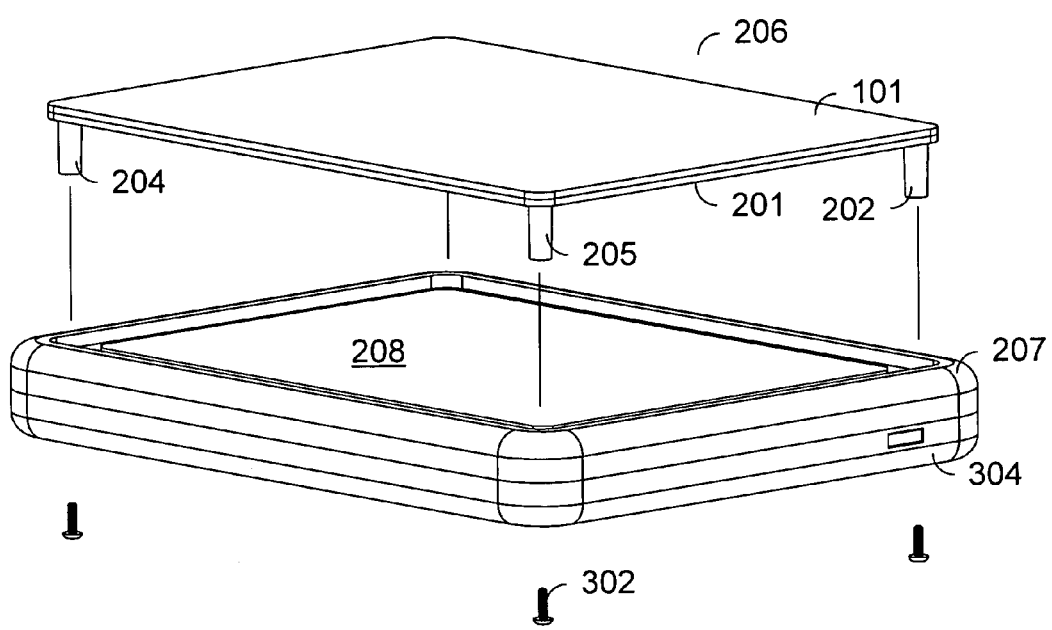
FIG. 4 shows the tablet computer of FIG. 1 with a cover window assembly in accordance with an example embodiment of the invention.

FIG. 4 shows computer 100 with cover window assembly 206 in position to be assembled to the rest of computer 100. The attachment is simple and can be performed with simple tools. A user of computer 100 may replace the cover window assembly inexpensively, and quickly enough that the user would experience little computer downtime. For example, should cover window 101 became scratched, cracked, or broken, a user may order a replacement and do the repair without sending the computer to a repair center.

Figure 5A:
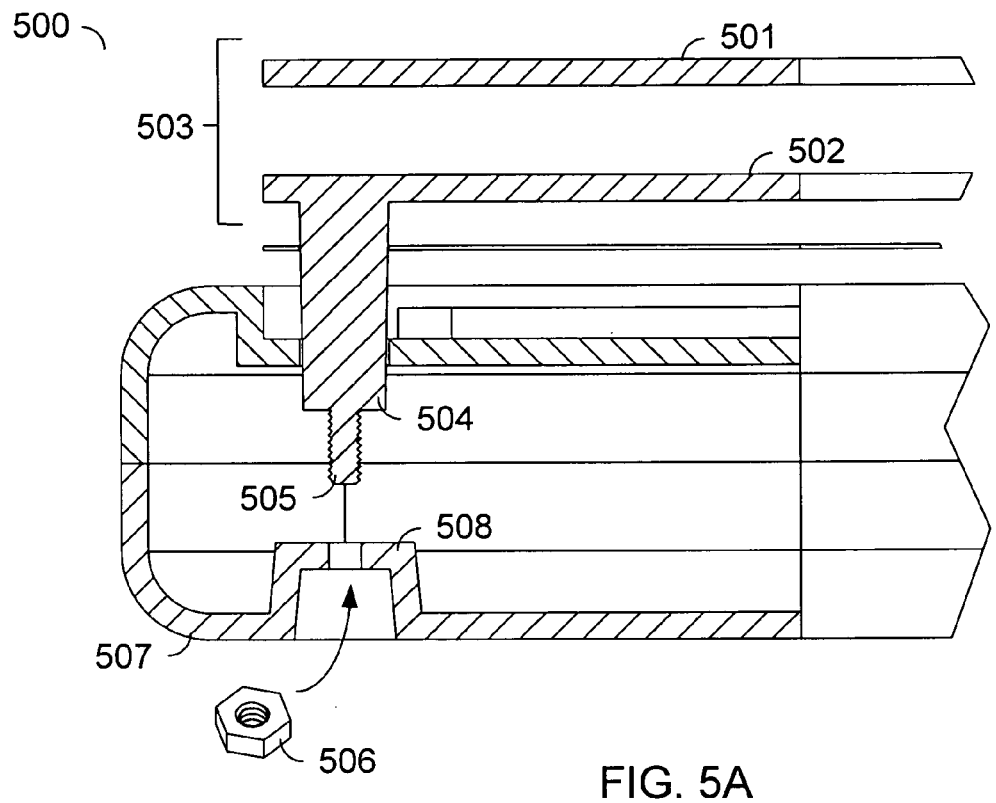
FIG. 5A shows an exploded section view of a portion of a tablet computer in accordance with a second example embodiment of the invention.
Figure 5B:
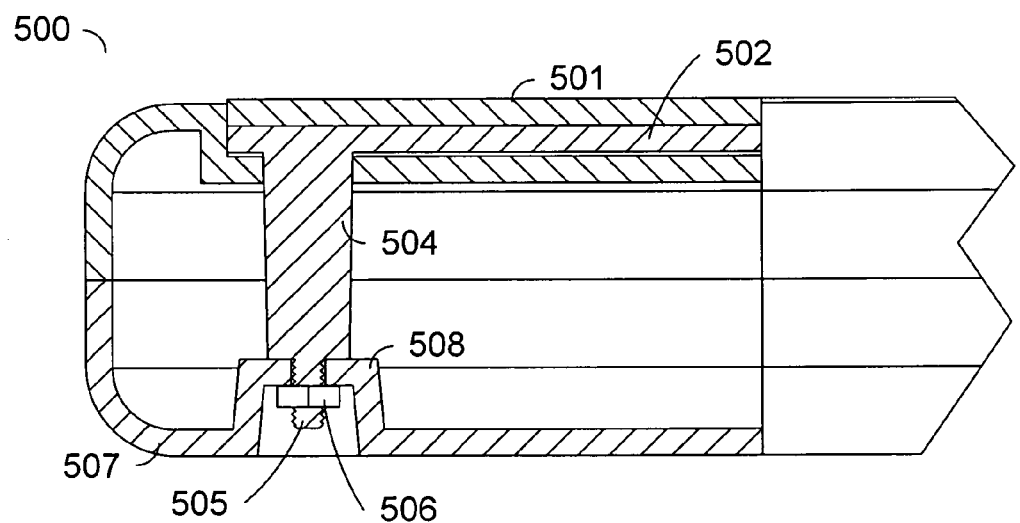
FIG. 5B shows a section view of the tablet computer of FIG. 5A in its assembled state.

FIG. 5A shows an exploded section view of part of a computer 500 in accordance with a second example embodiment of the invention, and FIG. 5B shows section view of part of computer 500 in its assembled state. In this second example embodiment, cover window 501 and frame 502 make up cover window assembly 503. Frame 502 comprises a boss 504, which further comprises a threaded stud 505 protruding from it. During assembly, stud 505 protrudes through lower shell 507 of computer 500. Stud 505 receives a nut 506, which secures cover window assembly 503 to the rest of computer 500. After assembly, nut 506 resides in boss 508 comprised in lower shell 507 of computer 500, and contacts a bottom side 509 of computer 100.

One of skill in the art will recognize that other kinds of fasteners may be used to assemble a cover window assembly to a tablet computer or other electronic device in accordance with the invention.

An additional advantage of a cover window attachment system in accordance with the invention is that it also provides an upgrade path for computer 100. For example, a less expensive model of computer 100 may comprise a lower-performance window 101 as compared with a more expensive computer model. After owning the computer for a time, a computer user could upgrade to a high-strength glass, or a window with other desirable properties, such as anti-reflective coatings. For example, a less expensive model of computer 100 may have a window made of a plastic, such as polycarbonate, and a user may wish to upgrade to a window made of glass.

In a method in accordance with an example embodiment of the invention for assembling a cover window to an electronic device, a cover window assembly as previously described is provided. Each boss on the assembly is inserted into the electronic device from its front side. A fastener is provided to engage with a fastener receiving feature on each boss. Each fastener contacts the back side of the electronic device. When a worn or damaged cover window is to be replaced, the method further comprises removing a second, prior cover window assembly before assembling the new cover window to the electronic device.

While the example embodiments described thus far have used a portable computer as the example electronic device, other devices may be used as well. For example, the invention may be embodied in a system comprising a personal digital assistant (PDA). A PDA is a portable device, often handheld and carried with its user, that stores information for ready retrieval and use. For example, a user may store addresses and telephone numbers of people that are frequently contacted, digital books for convenient reading at any location, digital photographs, digital music that can be played when desired, or other kinds of information. A user of a PDA may enter data into or control the PDA using a stylus, "writing" or making selections by touching the stylus to a cover window on the PDA. A PDA may comprise a cover window that is subject to wear or other damage, and a PDA may benefit from a design in accordance with the invention.

The invention claimed is:

1. A cover window attachment system for an electronic device, comprising:
    a case on a top side of the electronic device;
    a user-replaceable window cover assembly further comprising a cover window, a frame attached to the cover window, the frame further comprising at least one boss configured to protrude into the electronic device through an opening in the case, and a fastener receiving feature on a distal end of each boss; and
    a fastener engaging the fastener receiving feature on each boss, each fastener contacting a bottom side of the electronic device, opposite the top side.

2. The cover window attachment system claim 1, wherein the electronic device is generally rectangular, and the frame comprises four bosses, one proximate each of four corners of the electronic device, each boss configured to protrude through a respective opening in the case on the top side of the electronic device.

3. The cover window attachment system of claim 1, wherein the cover window is attached to the frame using an adhesive.

4. The cover window attachment system of claim 1, wherein the cover window is attached to the frame using an adhesive tape.

5. The cover window attachment system of claim 1, wherein each boss is integrally formed with a main portion of the frame.

6. The cover window attachment system of claim 1, wherein the fastener receiving feature is a threaded hole and the fastener is a screw.

7. The cover window attachment system of claim 1, wherein the fastener receiving feature is a threaded stud and the fastener is a nut.

8. The cover window attachment system of claim 1, further comprising a gasket disposed between the frame and the case of the electronic device.

9. The cover window attachment system of claim 1, wherein the cover window is made of glass.

10. The cover window attachment system of claim 1, wherein the cover window is made of plastic.

11. A method of assembling a cover window to an electronic device, comprising:
    providing a cover window assembly further comprising a cover window attached to a frame, the frame further comprising at least one boss configured to protrude into the electronic device, each boss further comprising a fastener receiving feature at a distal end of the boss;
    inserting each boss into the electronic device through an opening in a top case on a front side of the electronic device;
    providing a fastener for each boss; and
    engaging each fastener with a fastener receiving feature, each fastener contacting a back side of the electronic device, opposite the front side.

12. The method of claim 11, wherein providing a cover window assembly further comprises attaching the cover window to the frame using an adhesive.

13. The method of claim 11, wherein providing a cover window assembly further comprises attaching the cover window to the frame using an adhesive tape.

14. The method of claim 11, wherein:
    the frame comprises four bosses;
    the electronic device is generally rectangular, comprising four corners; and
    inserting each boss into the electronic device further comprises inserting the four bosses into the electronic device, each through a separate opening in the top case proximate a corner of the generally rectangular electronic device.

15. The method of claim 11, wherein providing a cover window assembly further comprises forming each boss integrally with a main portion of the frame.

16. The method of claim 11, wherein the fastener receiving feature is a threaded hole, and the fastener provided is a screw.

17. The method of claim 11, wherein the fastener receiving feature is a threaded stud, and the fastener provided is a nut.

18. The method of claim 11, further comprising:
providing a gasket; and
positioning the gasket between the cover window assembly and the case of the electronic device.

19. The method of claim 11, further comprising:
removing a second cover window assembly prior to assembling the first cover window assembly to die electronic device.

20. The method of claim 11, wherein providing a cover window assembly comprises providing a cover window made of glass.

21. The method of claim 11, wherein providing a cover window assembly comprises providing a cover window made of plastic.

22. An electronic device, comprising:
a cover window assembly further comprising a cover window attached to a frame, the frame further comprising at least one boss configured to protrude into the electronic device;
a case further comprising, on a front side, an opening configured to receive each boss;
a fastener receiving feature on a distal end of each boss;
a fastener engaged with each fastener receiving feature, each fastener contacting a back side of the electronic device, opposite the front.

23. The electronic device of claim 22, wherein the electronic device is generally rectangular, and wherein the cover window assembly comprises four bosses, one proximate each of four corners of the electronic device.

24. The electronic device of claim 22, wherein the fastener receiving feature is a threaded hole and the fastener is a screw.

25. The electronic device of claim 22, wherein the fastener receiving feature is a threaded stud and the fastener is a nut.

26. The electronic device of claim 22, wherein the cover window is attached to the frame using an adhesive.

27. The electronic device of claim 22, wherein the cover window is attached to the frame using an adhesive tape.

28. The electronic device of claim 22, wherein each boss is integrally formed with a main portion of the frame.

29. The electronic device of claim 22, further comprising a gasket disposed between a main portion of the frame and a case of the electronic device.

30. The electronic device of claim 22, wherein the electronic device is a tablet portable computer.

31. The electronic device of claim 22, wherein the electronic device is a personal digital assistant.

32. The electronic device of claim 22, wherein the cover window is made of glass.

33. The electronic device of claim 22, wherein the cover window is made of plastic.

34. An electronic device, comprising:
means for attaching a cover window to a frame, the frame further comprising at least one boss configured to protrude into an opening in a case on a front side of the electronic device; and
means accessible from a back side of the electronic device for securing the cover window assembly against the front side of the electronic device by engaging with each boss.

* * * * *

UNITED STATES PATENT AND TRADEMARK OFFICE
CERTIFICATE OF CORRECTION

PATENT NO. : 7,187,540 B2 Page 1 of 1
APPLICATION NO. : 11/038894
DATED : March 6, 2007
INVENTOR(S) : Steven S Homer et al.

It is certified that error appears in the above-identified patent and that said Letters Patent is hereby corrected as shown below:

On the Title page, in field (75), in "Inventors", in column 1, line 1, delete "Tombal" and insert -- Tomball --, therefor.

In column 4, line 4, in Claim 2, after "system" insert -- of --.

In column 5, line 10, in Claim 19, delete "die" and insert -- the --, therefor.

Signed and Sealed this

Third Day of March, 2009

JOHN DOLL
*Acting Director of the United States Patent and Trademark Office*